United States Patent [19]
Yamamoto et al.

[11] Patent Number: 5,773,834
[45] Date of Patent: Jun. 30, 1998

[54] METHOD OF FORMING CARBON NANOTUBES ON A CARBONACEOUS BODY, COMPOSITE MATERIAL OBTAINED THEREBY AND ELECTRON BEAM SOURCE ELEMENT USING SAME

[75] Inventors: Kazuhiro Yamamoto, Kashiwa; Yoshinori Koga, Abiko; Shuzo Fujiwara, Tsukuba, all of Japan

[73] Assignee: Director-General of Agency of Industrial Science and Technology, Japan

[21] Appl. No.: 799,767

[22] Filed: Feb. 12, 1997

[30] Foreign Application Priority Data

Feb. 13, 1996 [JP] Japan .................................. 8-025037

[51] Int. Cl.$^6$ .................................................. H01J 27/02
[52] U.S. Cl. .................................. 250/423 F; 250/492.3; 204/192.11; 204/298.04
[58] Field of Search .................. 250/423 F, 492.1, 250/492.3; 313/309, 336, 351; 156/643.1; 204/192.11, 298.04

[56] References Cited

U.S. PATENT DOCUMENTS

| | | | |
|---|---|---|---|
| 3,921,022 | 11/1975 | Levine | 250/423 F |
| 4,725,332 | 2/1988 | Spohr | 250/492.1 |
| 4,926,056 | 5/1990 | Spindt | 250/423 F |
| 5,626,812 | 5/1997 | Ebbesen et al. | 250/492.3 |

OTHER PUBLICATIONS

Appl. Phys. Lett. 69(27) 30 Dec. 1996 Yamamoto et al "New method carbon nanotube growth by ion beam indication", pp. 4174–4175.

*Primary Examiner*—Kiet T. Nguyen
*Attorney, Agent, or Firm*—Lorusso & Loud

[57] ABSTRACT

A composite material is produced by irradiating a surface of a shaped body of a carbonaceous material with an ion beam to form a layer of carbon nanotubes on the surface. The composite material is useful as a cathode of an electron beam source element.

12 Claims, 1 Drawing Sheet

F I G. 1
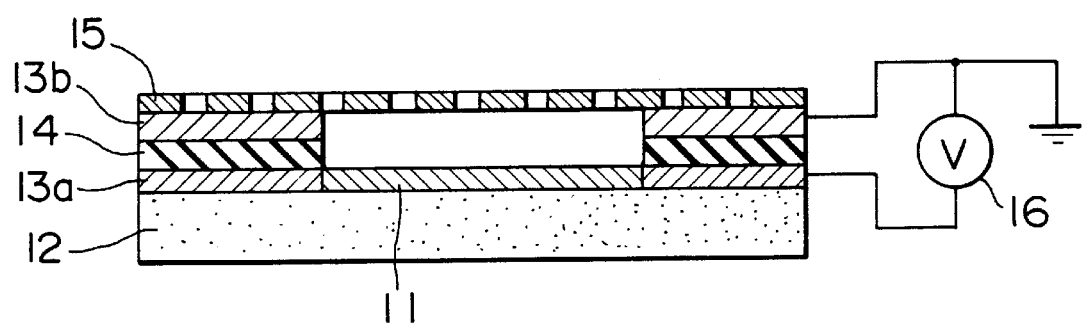

METHOD OF FORMING CARBON NANOTUBES ON A CARBONACEOUS BODY, COMPOSITE MATERIAL OBTAINED THEREBY AND ELECTRON BEAM SOURCE ELEMENT USING SAME

BACKGROUND OF THE INVENTION

This invention relates to a method of forming carbon nanotubes on a carbonaceous body, a composite material obtained by the above method and a electron beam source element using the above composite material.

Carbon nanotubes are recently discovered, hollow graphite tubules having a diameter of generally several to several tens nanometers. One method for the preparation of carbon nanotubes is disclosed by Ebbesen et al (Nature, 358, 220 (1992)) and includes applying a DC potential between a graphite rod anode and cathode which are coaxially disposed in a reaction vessel maintained in an inert gas atmosphere such as argon or helium. By positioning the two rods close to each other, an arc discharge occurs with the simultaneous deposition of a carbonaceous material containing carbon nanotubes on the cathode rod. The carbon nanotubes dispersed in the carbonaceous material may be isolated therefrom. A method is also known for the production of carbon nanotubes by laser abrasion of graphite in helium gas of 100 Torr.

As one application of carbon nanotubes, there is a proposal to use the carbon nanotubes as an electrode. To achieve this purpose, it is necessary to isolate the carbon nanotubes from other carbonaceous material in which the carbon nanotubes are dispersed. The isolated carbon nanotubes are then arrayed and, thereafter, an electrical terminal is provided on the arrayed nanotubes. Because the carbon nanotubes are extremely small, it is very difficult to array the carbon nanotubes and attach the terminal thereto.

Summary of the Invention

It is, therefore, the prime object of the present invention to provide a method of producing a composite material which has carbon nanotubes formed on a surface of a shaped carbonaceous body and which can be used as such for the construction of an electron beam source element.

In accomplishing the above object, the present invention provides a method of producing a composite material, comprising irradiating a surface of a shaped body of a carbonaceous material with an ion beam to form a layer of carbon nanotubes on said surface.

In another aspect, the present invention provides a composite material obtained by above the method.

The present invention further provides an electron beam source element, comprising:

a positive electrode in the form of a net and having a lead member extending from said positive electrode for connection to a positive pole of a DC source, a composite material obtained by the above method and having a lead member extending from said shaped body for connection to a negative pole of said DC source, and an insulating member interposed between said positive electrode and said composite material, so that when said element is placed in a vacuum and when an electric potential is impressed between said positive electrode and said composite material, an electron beam is generated from said layer of carbon nanotubes and ejected through said net.

BRIEF DESCRIPTION OF THE DRAWING

Other objects, features and advantages of the present invention will become apparent from the detailed description of the preferred embodiments of the invention which follows, when considered in light of the accompanying drawing, in which:

FIG. 1 is a cross-sectional, elevational view schematically illustrating an embodiment of an electron beam source element according to the present invention.

DETAILED DESCRIPTION OF THE PREFERRED Embodiments of the Invention

In the process according to the present invention, a surface of a shaped body of a carbonaceous material is irradiated with an ion beam to form carbon nanotubes on the irradiated surface.

The carbonaceous material may be, for example, graphite, fullerenes or amorphous carbon and is in the form of a film, a plate, a rod, a cylinder, a block or any other suitable shape. Such a shaped body of the carbonaceous material may be produced by any known method such as by press molding.

The ion beam may be, for example, an argon ion beam, a krypton ion beam, a neon ion beam, a xenon ion beam, a nitrogen ion beam or a gallium ion beam and may be produced by any known method. The ion beam irradiation is preferably carried out at an ion acceleration voltage of 500–20,000 V, more preferably 3,000–10,000 V, an ion current of 0.01–1,000 mA, more preferably 1–100 mA, an ion beam irradiation time of 300–3,600 seconds, more preferably 600–1,800 seconds, and a pressure of $5 \times 10^{-4}$ Torr or less, more preferably $5 \times 10^{-5}$ Torr or less.

It is preferred that the ion beam be irradiated at an angle of 0–20 degrees with respect to the line normal to the surface which is irradiated therewith for reasons of efficient production of carbon nanotubes.

By the irradiation with the ion beam, carbon nanotubes are formed on the irradiated surface. The carbon nanotubes extend linearly obliquely from the irradiated surface. Each of the carbon nanotubes is in the form of a hollow tube having an outside diameter ranging from 2 to 50 nm and an inside diameter ranging from 1 to 20 nm. The average outside diameter and the average inside diameter are typically about 20 and about 5 nm, respectively, though the average diameters vary according to the irradiation conditions. The length of the carbon nanotubes ranges from 0.01 to 5 $\mu$m and the average length is in the range of 0.2–1 $\mu$m.

The thus obtained composite material having carbon nanotubes formed on the only surface of the shaped carbonaceous body that is irradiated with the ion beam can be used as such for the construction of an electron beam source element.

An example of an electron beam source element is schematically shown in FIG. 1, in which designated as 12 is a graphite disc having a central surface portion on which a layer 11 of carbon nanotubes is formed in the manner described above. A first annular electrode 13a made of a copper plate is provided directly on a periphery of the graphite disc 12. The first annular electrode 13a is overlaid with an insulating layer 14 made of alumina, on which a second annular electrode 13b made of a copper plate is provided. A conductive mesh 15 such as a copper net is provided on the second annular electrode 13b in electrical contact therewith. The first and second electrodes 13a and 13b are adapted to be coupled with a negative pole and a positive pole, respectively, of a DC power source 16. When the above assembly is placed in a vacuum chamber and when the DC voltage is applied between the first and second electrodes 13a and 13b, an electron beam is generated from the carbon nanotubes 11 and ejected through the mesh 15.

The following examples will further illustrate the present invention.

EXAMPLE 1

In an ion beam sputtering device equipped with a Kaufmann-type ion gun, a graphite disc (diameter: 10 mm, thickness 0.3 mm) was set as a target. The ion beam sputtering was performed using argon as the ion gas. Argon gas was introduced into the sputtering device and argon ion was bombarded on the graphite disc, after the device had been evacuated to a pressure of $2 \times 10^{-7}$ Torr. During the sputtering, the argon gas pressure was $2 \times 10^{-4}$ Torr. The sputtering was performed at an acceleration voltage for the ion gun of 1,200 V, an ion current of 1 mA and an ion beam bombarding time of 180 seconds.

When the bombarding angle (the angle of the incident argon ion relative to the line normal to the plane of the graphite disc) was greater than 30 degrees, the surface of the disc was etched and became considerably rugged. With a bombarding angle of not greater than 30 degrees but greater than 20 degrees, carbon atoms ejected from the graphite disc were found to deposit again onto the graphite disc. The deposits were found to be amorphous carbon containing diamond bonds ($sp^3$ hybrid bonds). When the bombarding angle was between 0–20 degrees, fibrous deposits were formed on the surface of the graphite disc bombarded by the argon beam. Transmission electron microscope revealed that the fibrous deposits were carbon nanotubes having a hollow structure. Further, the electron beam energy loss spectroscopy of the carbon K-absorption edge also revealed that the energy loss spectrum of fibrous deposits were the same as that of carbon nanotubes obtained by arc discharge of graphite in helium gas.

The above procedures were repeated in the same manner as described except that the graphite disc was substituted with an amorphous carbon film and with a disc obtained by press molding of fullerene powder. Carbon nanotubes were formed on a region of the amorphous carbon film and the fullerene disc bombarded by the argon ion beam with a bombarding angle between 0–20 degrees. Further, the above procedures were repeated in the same manner as described except that argon ion beam was replaced by a krypton ion, xenon ion or nitrogen ion beam. Carbon nanotubes were formed with a bombarding angle between 0–20 degrees.

EXAMPLE 2

In a focused ion beam machining device (FB-2000 manufactured by Hitach Ltd.) equipped with an ion source of liquid Ga, an optical system for focusing the ion beam and a deflecting system, a graphite disc (diameter: 10 mm, thickness 0.3 mm) was set on a sample holder. The ion beam irradiation was performed after the device had been evacuated to a pressure of $2 \times 10^{-6}$ Torr. The ion beam irradiation was performed at an acceleration voltage for the ion beam of 10,000 V, an ion current of 100 mA and an ion beam irradiation time of 600 seconds.

When the irradiation angle (the angle of the incident Ga ion beam relative to the line normal to the plane of the graphite disc) was greater than 20 degrees, the surface of the disc was etched and became considerably rugged. When the irradiation angle was between 0–20 degrees, fibrous deposits were formed on the surface of the graphite disc irradiated with the Ga ion beam. Transmission electron microscope revealed that the fibrous deposits were carbon nanotubes having a hollow structure. Further, the electron beam energy loss spectroscopy of the carbon K-absorption edge also revealed that the energy loss spectrum of fibrous deposits were the same as that of carbon nanotubes obtained by arc discharge of graphite in helium gas.

The above procedures were repeated in the same manner as described except that the graphite disc was substituted with an amorphous carbon film and with a disc obtained by press molding of fullerene powder. Carbon nanotubes were formed on a region of the amorphous carbon film and the fullerene disc irradiated by the Ga ion beam with an irradiation angle between 0–20 degrees.

EXAMPLE 3

An electron beam source element as shown in FIG. 1 was prepared using a graphite disc 12 having a carbon nanotube layer 11 on a center, surface portion thereof. The carbon nanotubes-bearing graphite disc was prepared in the same manner as that in Example 1. An alumina thin film was used as an insulating layer 14 and a copper mesh was used as an electron beam output electrode 15. An negative electrode 13a is interposed between the insulating layer 14 and the graphite disc 12 for electrical contact the graphite disc, while a positive electrode 13b is interposed between the insulating layer 14 and the output electrode 15 for electrical contact with the output electrode 15. The resulting assembly (electron beam source element) was placed in a vacuum chamber evacuated to vacuum of $2 \times 10^{-6}$ Torr. A electric potential was then impressed between the two electrodes 13a and 13b and was gradually increased. At about 100 V, an electrical current began flowing. At about 500 V, an electrical current of 10 mA was obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing a composite material, comprising the step of irradiating a surface of a shaped body of a carbonaceous material with an ion beam, in a vacuum, to form a layer of carbon nanotubes as a deposit on said surface by sputtering.

2. A method as claimed in claim 1, wherein said carbonaceous material is selected from the group consisting of fullerenes, graphite and amorphous carbon.

3. A method as claimed in claim 1, wherein said ion beam is irradiated at an angle of 0–20 degrees with respect to the line perpendicular to said surface.

4. A method as claimed in claim 1, wherein said ion beam is selected from the group consisting of argon ion beam, krypton ion beam, neon ion beam, xenon ion beam, nitrogen ion beam and gallium ion beam.

5. A composite material in the form of a shaped body having a surface layer of carbon nanotubes and obtained by a method according to claim 1.

6. A composite material according to claim 5 wherein said nanotubes extend linearly and obliquely from the irradiated surface.

7. An electron bean source element, comprising:

a positive electrode in the form of a net and having a lead member extending from said positive electrode for connection to a positive pole of a DC source, a composite material in the form of a shaped body having a surface layer of carbon nanotubes and obtained by a method according to claim 1 and having a lead member extending from said shaped body for connection to a negative pole of said DC source, and an insulating member interposed between said positive electrode and said composite material, so that when said element is placed in a vacuum chamber and when an electric potential is impressed between said positive electrode and said composite material, an electron beam is generated from said layer of carbon nanotubes and ejected through said net.

8. A method according to claim 1 further comprising:

evacuating an ion beam device to a pressure of $5\times10^{-4}$ Torr or less; and introducing an ion source to an ion generator mounted within the ion beam device to generate ions and form an ion beam.

9. A method according to claim 8 wherein said pressure is $5\times10^{-5}$ Torr or less.

10. A method according to claim 8 further comprising focusing the generated ions to form the ion beam.

11. A method according to claim 1 wherein said vacuum is $5\times10^{-4}$ Torr or less.

12. A method according to claim 1 wherein said vacuum is $5\times10^{-5}$ Torr or less.

* * * * *